Sept. 7, 1965    W. H. DANIEL    3,204,768
SEWAGE TREATMENT APPARATUS
Filed Jan. 21, 1963
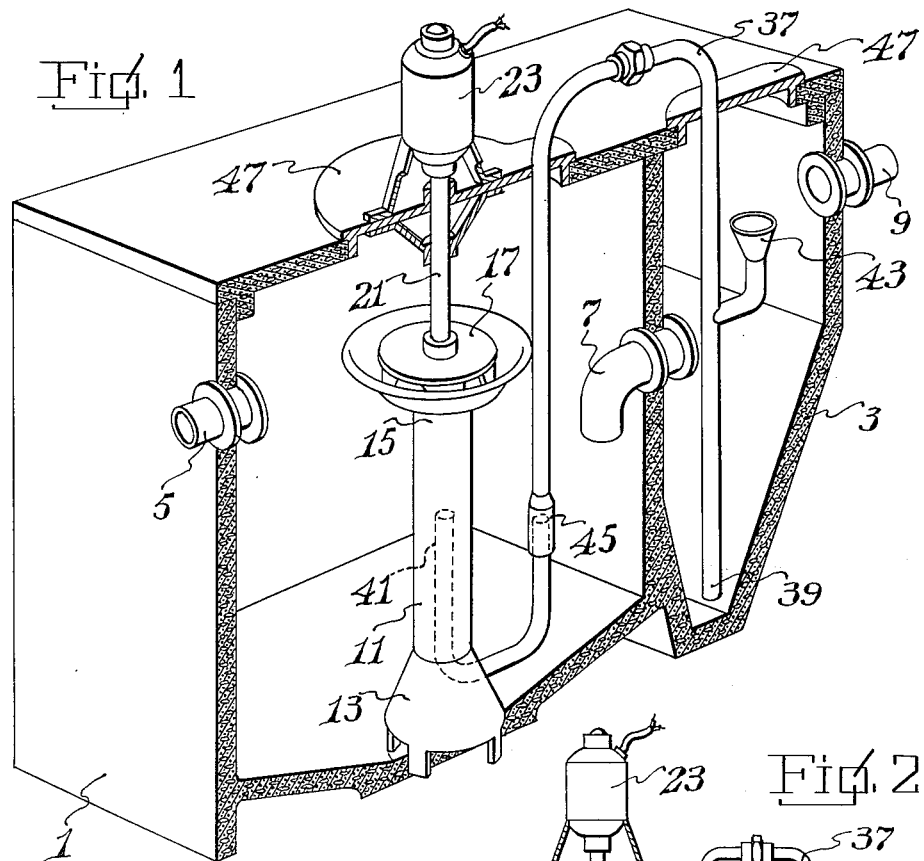
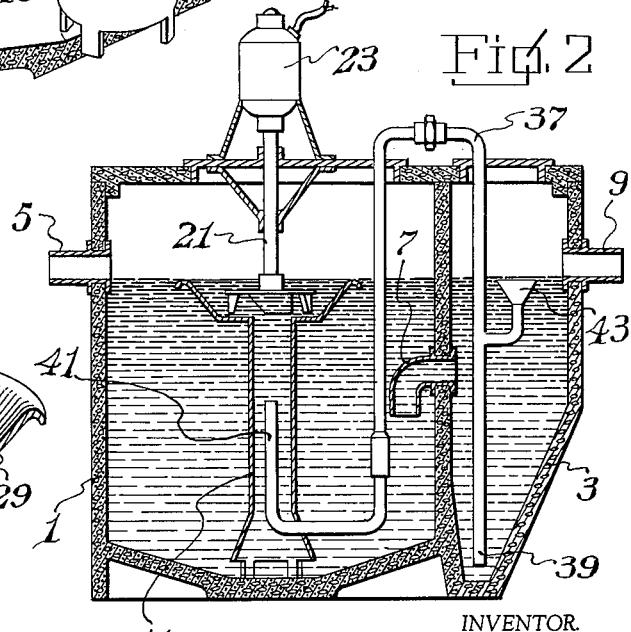
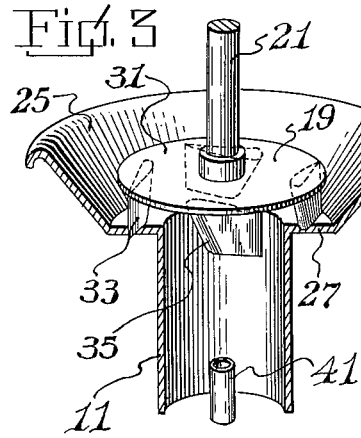
INVENTOR.
William H. Daniel
BY
Robert J. Patch
ATTY.

United States Patent Office 3,204,768
Patented Sept. 7, 1965

3,204,768
SEWAGE TREATMENT APPARATUS
William H. Daniel, 2894 S. Utica, Tulsa, Okla.
Filed Jan. 21, 1963, Ser. No. 252,705
2 Claims. (Cl. 210—197)

The present invention relates to sewage treatment apparatus, more particularly of the type designed to promote the aerobic decomposition of solids in admixture with liquid sewage material.

It is an object of the present invention to provide sewage treatment apparatus adapted to promote the aerobic decomposition of solids admixed in liquid sewage material.

Another object of the present invention is the provision of sewage treatment apparatus designed to avoid the accumulation of solids in any portion of the apparatus.

Still another object of the present invention is the provision of sewage treatment apparatus designed to avoid the discharge of foam from the apparatus.

Finally, it is an object of the present invention to provide sewage treatment apparatus that will be relatively simple and inexpensive to manufacture and install, easy to operate, maintain and repair, and rugged and durable in use.

Other objects and advantages of the present invention will become apparent from a consideration of the following description, taken in connection with the accompanying drawing, in which:

FIGURE 1 is a perspective view, with parts broken away, showing sewage treatment apparatus according to the present invention;

FIGURE 2 is an elevational view of the structure shown in FIGURE 1, with further parts broken away; and FIGURE 3 is an enlarged fragmentary perspective view of the relatively movable parts of the invention showing certain of their operative relationships.

Referring now to the drawing in greater detail, there is shown sewage treatment apparatus comprising a plurality of tanks through which sewage to be treated moves in series. For the sake of simplicity, only two tanks are shown, it being understood that any suitable number may be used. Specifically, there is shown in FIGURES 1 and 2 a first tank 1 and a second tank 3. First tank 1 has an inlet 5 which comprises means for introducing liquid sewage material with entrained solids into tank 1. A conduit 7 communicates between tanks 1 and 3 and provides means for transferring liquid sewage material from an upper portion of tank 1 into tank 3. Tank 3, in turn, is provided with an outlet 9 that comprises means for removing liquid sewage material from tank 3. Preferably, the level of outlet 9 is a little below the level of inlet 5 so as to promote the flow of liquid from inlet 5 into tank 1 and through conduit 7 into tank 3 and out through outlet 9.

A vertical conduit 11 is disposed in tank 1 and is open at its lower end 13 and at its upper end 15. The bottom of tank 1 is downwardly declined on all sides toward lower end 13 to promote the movement by gravity of solid materials toward the inlet to conduit 11 at lower end 13. An impeller 17 is disposed adjacent upper end 15 and comprises a rotor 19 depending from a drive shaft 21 which in turn depends from and is driven by a motor 23 and is coaxial with upper end 15 of conduit 11. Impeller 17 with its associated structure provides means for moving liquid with entrained solids upwardly in conduit 11.

In greater detail, the structure at the upper end 15 of conduit 11 comprises an upwardly open bowl 25 of a diameter substantially greater than the diameter of conduit 11 and concentric with conduit 11. Bowl 25 has a bottom wall 27 that is horizontal and is annular about upper end 15 of conduit 11. Bottom wall 27 terminates radially in upwardly outwardly inclined side walls 29 that extend up to about the level of liquid in tank 1 as determined by the relative positions of inlet 5 and outlet 9.

Rotor 19, in turn, includes a horizontal circular plate 31 mounted coaxially on the lower end of drive shaft 21. Plate 31 supports a plurality of downwardly extending vanes 33 that have their radially inner sides of airfoil configuration and that are disposed at positive angles of pitch of about 5° to 20° relative to the tangents to the circular loci of the centroids of the cross sections of the vanes. The structure and function of the rotor with its vanes 33 is described more fully in my copending application Serial No. 81,997, filed January 11, 1961, to which reference is made for a fuller description of this portion of the invention so as to avoid the inclusion of unnecessary detail in the present specification. Suffice it to say that vanes 33 are disposed radially outwardly beyond the inner side walls of conduit 11, that is, the innermost portion of vanes 33 are spaced from the axis of rotation of rotor 19 a distance greater than the radius of conduit 11 at the upper end 15 thereof.

Vanes 33 are thus disposed directly above bottom wall 27 of bowl 25; and rotor 19 is spaced from bowl 25 on all sides. Vanes 33 are thus spaced above bottom wall 27. Also, it is noteworthy that vanes 33 have leading edges 35 that are inclined downwardly rearwardly with regard to the direction of rotation of rotor 19. This assures that when rotor 19 stops, any solid materials that have become caught on the inclined leading edges 35 of vanes 33 will tend to fall by gravity from the vanes. Moreover, the spacing of the vanes above bottom wall 27 and the spacing of rotor 19 on all sides from bowl 25 also help to prevent the clogging of solid material between the rotor and bowl 25.

The operation of the device as described thus far, therefore, is that upon actuation of the impeller 17 so that rotor 19 turns clockwise as seen in FIGURES 1 and 3, liquid with entrained solid material will be drawn into lower end 13 of conduit 11 and will rise through conduit 11 and emerge from upper end 15 of conduit 11 and pass between vanes 33 and up and over inclined side walls 29 of bowl 25, whence the material will fall back to the remainer of the material in tank 1. In being thus agitated and exposed to the atmosphere above conduit 11, however, the solid materials entrained in the liquid will be broken up and will be exposed to aerobic decomposition. The solids that are not broken up or decomposed in such a passage past the rotor will again settle to the bottom of tank 1 and be recycled up through conduit 11 as many times as necessary until they are broken up and decomposed. The clear liquor, substantially free from solid material, will flow slowly through conduit 7, it being noted that conduit 7 has a downwardly turned entrance end so as to minimize the entrainment of solid materials in the liquid that flows through conduit 7. Naturally, the flowrate through conduit 11 is very much faster than the flowrate through conduit 7, so that the materials that are carried through conduit 7 by entrainment in liquid are very small in quantity relative to those that are circulating through conduit 11.

Nevertheless, some solids are carried over to tank 3 and settle out in the bottom of tank 3, so that a conduit 37 is provided that communicates at its lower or entrance end 39 with the bottom of tank 3 and that extends from tank 3 into tank 1 and into conduit 11, and has its discharge end 41 disposed in conduit 11 opening downstream in conduit 11, that is, in the illustrated embodiment, opening upwardly. Discharge end 41 is of very much smaller diameter than conduit 11, so that the liquid flowing upwardly in conduit 11 has an eductor action relative to conduit 37 such that liquid is drawn into conduit 37 at lower end 39 thereof and is drawn through conduit 37 in the direction of the arrows in FIGURES 1 and 2 and emerges from discharge end 41 of conduit 37 whence it joins the stream in conduit 11 for recycling past rotor 19. The liquid entering lower end 39 of conduit 37 thus entrains whatever solids may have passed over into tank 3, thereby assuring that there will be no substantial accumulation of solids in the bottom of tank 3.

Not only solids but also foam may accumulate in tank 3, the foam of course being present on the surface of the liquid. Accordingly, a foam intake 43 is also provided as a branch of conduit 37, foam intake 43 opening upwardly adjacent the surface of the liquid in tank 3 as determined by the relative positions of inlet 5 and outlet 9. The eductor action of the upwardly moving liquid in conduit 11 also educts foam downwardly through foam intake 43 and into conduit 37 and back up through conduit 11 so as to avoid the passage of substantial quantities of foam out through outlet 9. For this purpose, foam intake 43 is disposed closely adjacent outlet 9.

It should also be noted that conduit 37 does not pass through the common wall that is shown connecting tanks 1 and 3. Instead, conduit 37 passes up and over that wall and back down into tank 1, so that conduit 37 may be quickly removed for inspection or repair or cleaning without the necessity of draining tanks 1 and 3. For this purpose, the conduit is provided with a slip joint 45 that permits removal of most of the conduit without disturbing conduit 11.

Finally, the assembly of the apparatus of the present invention is completed by hatchway covers 47 that close openings into the upper ends of tanks 1 and 3. It is convenient to pass conduit 37 through these hatchways and also to mount motor 23 on one of the hatchways. In this way, the relatively light hatchways can be raised either for access to the tanks or to remove conduit 37 or to remove impeller 17.

From a consideration of the foregoing disclosure, therefore, it will be evident that all of the initially recited objects of the present invention have been achieved.

Although the present invention has been described and illustrated in connection with a preferred embodiment, it is to be understood that modifications and variations may be resorted to without departing from the spirit of the invention, as those skilled in this art will readily understand. Such modifications and variations are considered to be within the purview and scope of the present invention as defined by the appended claims.

What is claimed is:

1. Sewage treatment apparatus comprising a tank, means for introducing sewage into the tank and for removing liquid from an upper portion of the tank, a tube communicating between a lower portion of the tank and an upper portion of the tank, and an impeller disposed above the upper end of the tube for moving liquid with entrained solids upwardly in the tube to expose solids accumulating in the bottom of the tank to the atmosphere in an upper portion of the tank thereby to promote aerobic decomposition of the solids, the tube terminating upwardly in an upwardly open fixed bowl of a diameter substantially greater than the diameter of the tube, the impeller being disposed in the bowl, the bowl having an outwardly extending bottom that terminates outwardly in an upwardly and outwardly inclined side wall, the impeller being a rotor mounted for rotation about a vertical axis and having a plurality of downwardly extending vanes having free lower ends which are spaced above the bottom of the bowl and the leading edges of which are downwardly rearwardly inclined, the vanes having convex airfoil configuration on their radially inner sides and having a positive pitch of between about 5° and 20°.

2. Sewage treatment apparatus as claimed in claim 1, all portions of the vanes being spaced from the axis of rotation a distance at least as great as the radius of the tube adjacent the bowl.

References Cited by the Examiner
UNITED STATES PATENTS

| | | | |
|---|---|---|---|
| 2,067,161 | 1/37 | Durdin | 210—197 |
| 2,090,384 | 8/37 | Durdin | 210—205 X |
| 2,165,889 | 7/39 | Fischer et al. | 210—220 X |
| 2,285,266 | 6/42 | Fulleman. | |
| 2,323,437 | 7/43 | Yeomans et al. | 210—197 |
| 2,434,896 | 1/48 | Ayers. | |
| 2,673,181 | 3/54 | Hughes | 210—220 X |
| 2,676,057 | 4/54 | Daugherty. | |
| 2,678,912 | 5/54 | Kalinske et al. | 210—220 X |
| 2,987,186 | 6/61 | Burgoon et al. | 210—197 |
| 3,053,390 | 9/62 | Wood | 210—221 X |
| 3,055,502 | 9/62 | Cunetta | 210—221 X |

REUBEN FRIEDMAN, *Primary Examiner.*

ROBERT F. BURNETT, *Examiner.*